United States Patent [19]

Vratny

[11] Patent Number: 4,481,251

[45] Date of Patent: Nov. 6, 1984

[54] POLYARYLATE POLYMER COATINGS

[75] Inventor: Frederick Vratny, Berkeley Heights, N.J.

[73] Assignee: AT&T Bell Laboratories, Murray Hill, N.J.

[21] Appl. No.: 489,042

[22] Filed: Apr. 27, 1983

[51] Int. Cl.³ .......................... B32B 3/00; B32B 5/16; B05D 1/00
[52] U.S. Cl. .................................. 428/312.6; 427/34; 427/407.1; 427/419.2; 428/312.8; 428/319.7
[58] Field of Search ..................... 427/34, 407.1, 407.2, 427/409, 419.2; 428/312.6, 312.8, 317.9, 480, 319.7; 528/193, 194

[56] References Cited

U.S. PATENT DOCUMENTS

| | | | |
|---|---|---|---|
| 3,160,602 | 12/1964 | Kantor et al. | 528/194 |
| 3,656,994 | 4/1972 | Economy et al. | 427/34 |
| 4,298,443 | 11/1981 | Maydan | 204/192 E |
| 4,397,724 | 8/1983 | Moran | 204/192 E |

*Primary Examiner*—William J. Van Balen
*Attorney, Agent, or Firm*—Lucian C. Canepa

[57] ABSTRACT

A polyarylate polymer is deposited on a substrate in accordance with a fabrication procedure that ensures an adherent low-stress conformal coating. Such a coating is advantageous for use in a number of industrial applications of practical importance.

12 Claims, No Drawings

POLYARYLATE POLYMER COATINGS

BACKGROUND OF THE INVENTION

This invention relates to polyarylate polymers and, more particularly, to a method for forming a polyarylate polymer coating on a substrate and to an article that includes such a coating.

In a variety of applications of practical importance, the need exists for overlaying a substrate with a layer of material having prescribed characteristics. Sometimes this need can be adequately met by bonding or otherwise securing a sheet of the material to the substrate. But, for many commercially significant applications, this approach is not completely satisfactory. Often, a more conformal and adherent overlayer, such as can be provided only by an applied coating of the material, is required.

Polyarylate polymers constitute a known class of plastic materials having a number of advantageous characteristics such as excellent electrical, mechanical, thermal and flammability properties. The relative ease with which these materials can be injection molded or extruded has led to their use in a number of industrial applications.

One significant commercial use for polyarylate polymer materials is as a covering for surfaces in the reaction chamber of a plasma-assisted etching apparatus, as disclosed in a copending commonly assigned U.S. patent application of J. M. Moran designated Ser. No. 295,839, filed Aug. 24, 1981 now U.S. Pat. No. 4,397,724. Illustratively, at least some of the surfaces in the immediate vicinity of a workpiece to be etched in such a chamber are covered with a sheet of a polyarylate polymer. Typically, the sheet is secured by screwing, riveting or adhesive bonding to an underlying substrate in the chamber. Contamination of the workpiece during the etching process is thereby substantially reduced, as described in detail in the aforecited application.

In practice, use of a sheet of polyarylate polymer material affixed to a substrate in an etching chamber sometimes leads to buckling or warping of the polymer material. In addition, cracking of the material, perhaps caused by stresses introduced into the material during molding or extrusion, sometimes occurs. And, in many cases, it is difficult or impossible to affix a sheet of the polyarylate polymer in a reliably adherent and conformal way to curved or relatively inaccessible surfaces in the etching chamber.

In view of the above, efforts have been directed by workers in the art aimed at trying to coat layers of polyarylate polymers onto substrates. But, heretofore, no completely satisfactory procedure for applying a coating of such a polymer to a substrate has been specified. It was recognized that if such a procedure could be devised, it would enable the attainment of a polyarylate-polymer-coated substrate having enhanced characteristics such as improved adhesion, better conformity and low stress. Accordingly, the development of such a coating for use in etching chambers, as well as in a variety of other industrial processes, has been a much-sought-after goal.

SUMMARY OF THE INVENTION

Hence, an object of the present invention is a method for forming a polyarylate polymer coating on a substrate. More specifically, an object of this invention is to form such a coating in an adherent, conformal and low-stress manner. Another object of the invention is an article that includes such a coating.

Briefly, these and other objects of the present invention are realized in a specific illustrative fabrication procedure in accordance with which a polyarylate polymer coating is deposited on a substrate. In accordance with a feature of the invention, the polymer material is dissolved in a solvent and then applied, for example, by spraying, to a previously prepared substrate surface. Preparation of the surface includes washing, abrasion and the formation thereon of an adherent intermediate layer onto which the polymer material is then applied.

DETAILED DESCRIPTION

Substrates coated with an adherent, conformal and low-stress polyarylate polymer film formed in accordance with the principles of the present invention are useful in a number of industrial and commercial applications. These applications include coating articles such as cookware where properties such as low contamination, high-temperature stability, long life and resistance to abrasion are important. Illustratively, one other significant application for such a coating is to cover surfaces in the reaction chamber of a plasma-assisted etching system such as the multifaceted reactive sputter etching system described in U.S. Pat. No. 4,298,443. Contamination of wafers during the etching process is thereby substantially reduced.

Polyarylate polymers are described in various publications as polyesters from diphenols and dicarboxylic acids. In this connection, see, for example, *New Commercial Polymers,* 1969–1975, revised edition by H. G. Elias, Gordon, page 91, 1977; *Modern Plastics Encyclopedia,* McGraw-Hill, pp. 50, 55, 1981; and *Plastics Design and Processing,* 1982 desk manual, pp. 77–78.

Numerous polyarylate polymers are available. One advantageous such polymer, designated Ardel and available in various specific types, respectively designated Ardel 100, Ardel 209 and Ardel 213, is made by and available in pellet form from Union Carbide, Bound Brook, N.J. (Ardel polymer is a trademark of Union Carbide.) Conventionally, the Ardel polymer pellets are processed by a number of commercial fabricators who, by molding or extrusion, convert the pellet-form material into strips, ribbons, plates, bars, sheets, etc. One source of such standard converted Ardel, for example, in the form of one-eighth-inch-thick sheets, is Westlake Plastics, Lenni, Pa.

Other polyarylate polymers are available from their respective manufacturers in pellet form and are also conventionally processed by commercial fabricators to form plates, sheets, bars, ribbons, strips, etc. These other polymers include U-Polymer made by Unitika Ltd., London, England and Durel polymer made by Hooker Chemicals and Plastics Corporation, Niagara Falls, N.Y. (Durel polymer is a trademark of Hooker Chemical.)

In accordance with the principles of the present invention, a polyarylate polymer coating is applied to a substrate made, for example, of aluminum, magnesium, titanium, stainless steel, ceramic, plastic or glass. Herein, primary emphasis will be directed to such a coating applied to a substrate made of a metallic material. For a reactive sputter etching system of the type specified above, the substrate of particular interest comprises a wafer-mounting tray member made, for example, of aluminum. Accordingly, the general purpose procedure specified below will in some instances be particularized to specify a detailed method especially adapted for coating a polyarylate polymer on such an aluminum tray member.

A basis for one main feature of the present invention was applicant's discovery that a particularly suitable solvent is available for dissolving polyarylate polymers. Before specifiying the solvent, attention will first be directed to various advantageous steps devised by applicant for preparing the surface of the substrate to be coated. These preparation steps are designed to ensure that the applied coating will adhere to the substrate in a particularly reliable manner.

Washing, abrading and rinsing of the substrate surface are desirable. For an aluminum surface, a suitable wash comprises 1,1,1 trichloroethane, naptha or industrial-grade alcohol. Thereafter, standard bead abrasion utilizing glass shot is effective to remove oxide from the surface. This is typically followed by a honing step employing aluminum oxide or silicon carbide powder. Rinsing of the surface with, for example, 1,1,1 trichloroethane is then carried out.

Next, in accordance with a specific feature of this invention, it is advantageous, prior to coating the surface of the substrate with polyarylate polymer material, to form on the substrate surface an intermediate adherent layer. In one particular embodiment, this intermediate layer constitutes a porous matrix that serves in effect to anchor subsequently applied polymer coating material to the substrate. Excellent adhesion of the polymer coating is thereby achieved.

In another particular embodiment, the intermediate layer, while also providing an excellent bond between the substrate and the overlying polymer coating, is selected to impart a particularly flexible character to the overall structure. This embodiment will be described in detail later below.

Illustratively, the intermediate layer constituting a porous matrix is formed from a mixture of aluminum oxide, titanium oxide and silicon dioxide powders. By way of a specific example, the mixture comprises approximately 94 percent by weight $Al_2O_3$ (having a particle size in the range 300-to-1000 micrometers), 3.5 percent by weight $TiO_2$ (having a particle size in the range 20-to-200 micrometers) and 2.5 percent by weight $SiO_2$ (having a particle size in the range 2-to-200 micrometers). Advantageously, the mixture is applied to the aforespecified substrate surface by means of a conventional flame or spray gun such as the P gun manufactured by Metco Incorporated, Westbury, Long Island, N.Y. Illustratively, an intermediate layer about 50-to-400 micrometers thick is thereby formed on the substrate surface.

The aforedescribed intermediate layer comprises a relatively porous matrix structure of aluminum oxide and silicon dioxide particles that adhere to each other and to the underlying substrate due mainly to the adhesive character of the constituent titanium oxide particles. The nominal porosity of this applied layer is approximately 15 percent. In other words, about 15 percent of the underlying substrate covered by the applied matrix layer can be "seen" through particle-to-particle gaps in the matrix.

Other suitable materials are available for forming an intermediate porous layer of the general type specified above. Such other materials include nickel aluminide, magnesium aluminum oxide (commonly called Mullite) and zirconate aluminum oxide (which comprises, for example, 90 percent by weight $Al_2O_3$, 6 percent by weight $ZrO_2$ and 4 percent by weight $TiO_2$). These materials also are advantageously applied to a washed, abraded and rinsed substrate surface by means of, for example, a conventional flame or spray gun. These alternative materials so applied also form a porous adherent layer useful for inclusion in applicant's unique herein-specified coating procedure.

In accordance with a feature of applicant's invention, a polyarylate polymer to be coated on a substrate prepared as specified above is dissolved in a solvent. Advantageously, polyarylate polymer pellets are first ground to form a powder having 20-to-200 mesh-size particles (that is, particles having dimensions in the range of about 50-to-600 micrometers). The polyarylate polymer powder is then dissolved in a commercially available liquid designated N methyl pyrrolidinone (NMP). A concentration of approximately 7.5 percent by weight of polyarylate polymer material to about 92.5 percent by weight of the NMP solvent is preferred. Alternatively, a concentration of the polymer in the range of approximately 1-to-15 percent by weight is acceptable.

Significantly and unexpectedly, the NMP liquid has been found by applicant to exhibit a relatively high solubility for polyarylate polymer material. Importantly, NMP does not degrade the advantageous characteristics of the polyarylate polymer in any ascertainable way. Moreover, NMP is easy to use and safe, being relatively nontoxic and nonflammable.

To achieve dissolution of the polyarylate polymer powder, about one-quarter at-a-time by weight of the powder is added to the NMP solvent. After each addition, gentle stirring of the mixture is carried out until it appears by visual examination that the powder has completely dissolved. After each stirring, the solution appears water clear with a slight yellow tint. By careful stirring and gradual addition of the polymer powder to the NMP solvent, formation of a gel is avoided.

The aforespecified NMP is the preferred solvent for polyarylate polymer material. Applicant has determined, however, that other solvents for this material are feasible. In general, though, because of factors such as higher toxicity, higher flammability, etc., these other solvents are usually regarded as less advantageous than NMP. These other solvents comprise monochlorobenzene (MCB), methylene chloride, tetrachloromethane, trichloromethane and monochloromethane.

After dissolving polyarylate polymer material in its specified solvent, the resulting liquid solution is applied to the aforedescribed prepared substrate surface. This is done, for example, by brushing or by spraying, utilizing a standard air gun. Other conventional application techniques such as dipping or electrostatic dispersal may also be used.

Illustratively, a specified thickness of a polyarylate coating is formed on the substrate by applying successive liquid layers thereto. In one specific illustrative application sequence in which a final polyarylate coating approximately 25-to-1500 micrometers thick above the surface of the intermediate layer is to be formed, 10-to-15 successive polyarylate layers are applied to the substrate. Each liquid layer is about 2.5-to-150 micrometers thick when first applied. The first few layers typically soak into the aforedescribed intermediate matrix layer.

After each application of a liquid polyarylate layer, the coated substrate is baked. This is done, for example, at about 110 degrees Celsius for approximately 10 minutes. As a result, the liquid layer is converted to a gel and then to a soft glass-like material. After the last layer is applied, the coated substrate is baked, at about 115 degrees Celsius for approximately 20 minutes, to remove substantially all of the solvent from the deposited multilayer polyarylate coating. In this last baking step, the entire coating is converted to a hard glass-like material.

A polyarylate polymer coating deposited on a substrate in accordance with the herein-described fabrication procedure is characterized by high adherence and conformity to the substrate and by low-stress properties. Such a coating remains crack-free and adherent to the substrate under a variety of harsh environmental conditions. The described procedure is simple, economical and reproducible. As a result, advantageous commercially significant polyarylate polymer coatings for numerous industrial applications are thereby made feasible.

Finally, it is to be understood that the above-described procedures are only illustrative of the principles of the present invention. In accordance with these principles, numerous modifications and alternatives may be devised by those skilled in the art without departing from the spirit and scope of the invention. For example, although primary emphasis herein has been directed to applying a coating of substantially pure polyarylate polymer to a substrate, there are applications of practical interest in which it is advantageous to add other materials to the polyarylate polymer. These other materials, which either dissolve or remain dispersed in the liquid solutions of dissolved polyarylate polymer, enhance various particular properties of the applied coating. By way of example, the added materials specified below comprise, in a dry mixture with polyarylate polymer material, only approximately 0.01-to-10 percent by weight of the mixture. In other words, the mixture consists essentially of polyarylate polymer.

Illustratively, for use in a plasma-assisted etching system, it may be advantageous to add Ekonol polymer powder (manufactured by Carborundum Corporation, Niagara Falls, N.Y.), aluminum oxide powder, titanium monoxide (or dioxide) powder or silicon carbide powder to the polyarylate polymer, thereby to enhance the capacitance and dielectric properties of the composite coating. For other uses, it may be advantageous to add coloring agents (such as titanium oxide, aluminum oxide, carbon black, Jewelers Rouge Red, cobalt oxide or Malachite Green) or sacrificial constituents (such as aluminum powder) or preferential absorbing constituents (such as carbon black or zeolites) to the polyarylate polymer. Or, to provide a composite coating having advantageous compliant properties, it may be advantageous to form a mixture comprising a polysulfone resin and polyarylate polymer material.

Additionally, intermediate layers other than the particular ones specified above may be interposed between the polyarylate polymer coating and the substrate. For example, to impart a more flexible character to the overall structure, it may be advantageous to provide an intermediate layer having particularly compliant properties. Illustratively, this may be achieved by forming the intermediate layer from Ekonol polymer powder that is plasma-spray deposited on the substrate. By way of example, Ekonol polymer powder can be so deposited by utilizing the 7MB gun made by the aforeidentified Metco Inc. For instance, in such a gun, Ekonol polymer powder having particles in the range of about 10-to-80 micrometers is supplied in an argon-nitrogen gas stream at a pressure of about 15-to-40 pounds per square inch. In this illustrative deposition process, the voltage and current in the gun are set at approximately 80 volts and at a value in the range 250-to-350 amperes, respectively.

What is claimed is:

1. An article comprising
    a substrate,
    and a final adherent conformal coating over at least a portion of said substrate, in which said coating is prepared by a procedure that includes applying a solution comprising a solvent and solute that includes material which may be regarded as a polymer polymerized from monomer at least 90 percent by weight of which is a mixture of at least one diphenol and at least one dicarboxylic acid,
    said article further comprising an adherent conformal layer intermediate said coating and the surface of said substrate, wherein said intermediate layer comprises a porous matrix.

2. An article as in claim 1 wherein said porous matrix comprises a plasma-spray-deposited mixture of aluminum oxide, titanium oxide and silicon dioxide.

3. A method of fabricating an article that includes a surface over at least a portion of which a final conformal coating is to be adhered, said method comprising
    applying over said surface to be coated a solution comprising a solvent and solute that includes material which may be regarded as a polymer polymerized from monomer at least 90 percent by weight of which is a mixture of at least one diphenol and at least one dicarboxylic acid.

4. A method as in claim 3 further including the step of removing solvent from said applied solution to form a substantially solvent-free glass-like coating.

5. A method as in claim 4 wherein said solvent comprises N methyl pyrrolidinone.

6. A method as in claim 5 wherein said removing step comprises baking said surface.

7. A method as in claim 4 further including the step of forming an adherent conformal layer intermediate said coating and said surface to be coated.

8. A method as in claim 7 wherein said intermediate layer comprises a porous matrix.

9. A method as in claim 8 wherein said porous matrix comprises a plasma-spray-deposited mixture of aluminum oxide, titanium oxide and silicon dioxide.

10. An article made by the method of claim 9.

11. A method of fabricating an article that includes a substrate surface over at least a portion of which a final conformal coating is to be adhered, said method comprising the steps of
    applying over said surface to be coated successive layers of a solution including at least 90 percent by weight polyarylate polymer dissolved in a solvent comprising N methyl pyrrolidinone,
    and removing solvent from each successive layer by baking to convert said layers to a substantially solvent-free glass-like coating.

12. A method as in claim 11 wherein said article is an etching system and said substrate surface is the surface of a wafer-holding tray member designed to be included in the reaction chamber of said system.

* * * * *